Aug. 20, 1940.　　　R. S. MORRIS　　　2,211,962
SERVING TRAY
Filed May 10, 1938　　　2 Sheets-Sheet 1
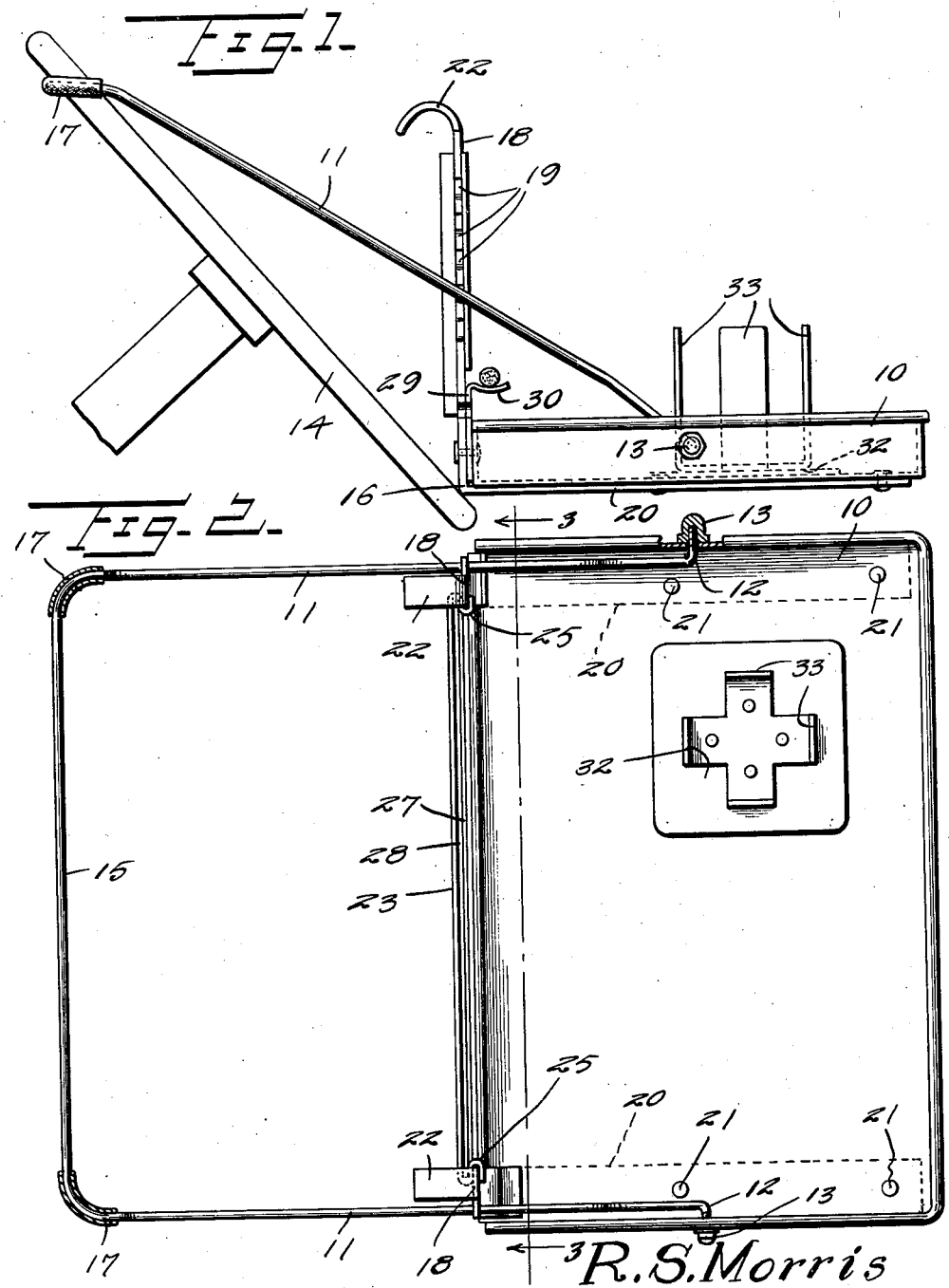
R.S.Morris
INVENTOR
BY *Victor J. Evans & Co.*
ATTORNEYS Aug. 20, 1940.   R. S. MORRIS   2,211,962
SERVING TRAY
Filed May 10, 1938    2 Sheets—Sheet 2
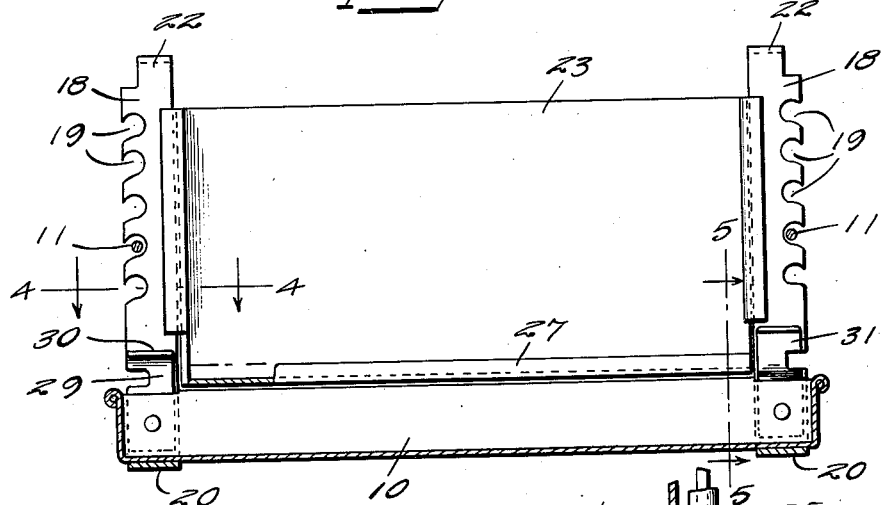
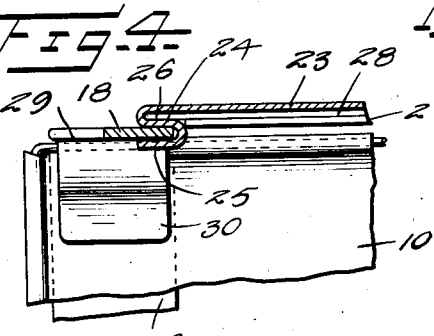
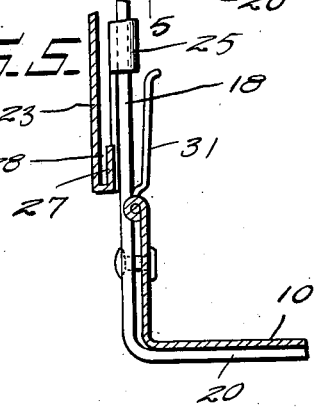
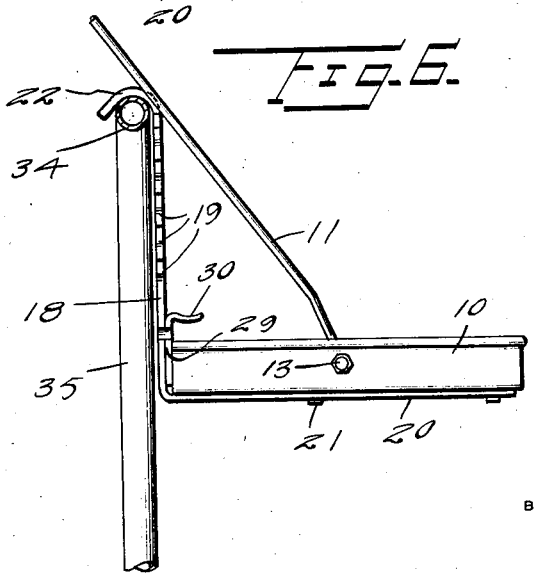
R. S. Morris
INVENTOR
BY Victor J. Evans & Co.
ATTORNEYS Patented Aug. 20, 1940

2,211,962

UNITED STATES PATENT OFFICE 2,211,962

SERVING TRAY

Robert S. Morris, Mount Calm, Tex.

Application May 10, 1938, Serial No. 207,094

4 Claims. (Cl. 311—21)

This invention relates to serving trays and more particularly to a portable and adjustable rack structure for serving food and refreshments to the occupants of automobiles.

The prime object of the invention is to provide a tray that can be readily attached to the steering wheel of the automobile and supported thereon in convenient reach of the driver so that he may be served individually and to eliminate the necessity of his reaching to the tray that is usually hung from the side of the car adjacent the door or window.

Other objects and advantages to be attained will hereinafter more fully appear.

The invention consists in the novel general structure and broad application of the device to the steering wheel and in the particular parts and combinations and arrangements of parts as hereinafter described and claimed, reference being had to the accompanying drawings illustrating a practical adaptation of the invention, and in which:

Figure 1 is a side elevation of the tray attached to the steering wheel.

Figure 2 is a top plan view of the tray detached from the steering wheel.

Figure 3 is a section taken substantially on the line 3—3 of Figure 2.

Figure 4 is a fragmentary cross section on the line 4—4 of Figure 3.

Figure 5 is a section on the line 5—5 of Figure 3.

Figure 6 is a view illustrating the manner of supporting the tray on a vertically disposed steering wheel or a loading rack.

Referring now to the drawings, the numeral 10 designates the body portion of the device which is in the form of a rectangular tray having a substantially U-shaped bail 11 pivotally attached thereto. As shown, the opposite end portions 12 of the bail are turned outwardly at right angles and extended through apertures provided therefor in the opposite end walls of the tray, said end portions 12 being screwthreaded to receive cap nuts 13 which abut the outer faces of the end walls of the tray to hold the bail in place.

In mounting the tray upon the steering wheel 14, as indicated in Figure 1, the intermediate transverse portion 15 of the bail is hooked under the upper portion of the steering wheel rim with the opposite leg portions of the bail extending downwardly over the wheel at an inclination therefrom and the tray 10 being set horizontally with its inner transverse edge portion resting against the outer side of the lower portion of the wheel, as at 16.

In order to prevent slippage of the bail 11 on the steering wheel 14 the corner portions of the bail are provided with sleeves 17 of rubber or other suitable material having a padding effect as well as affording a frictional engagement with the wheel rim so as to prevent marring of the rim as well as preventing slippage. In the mounted position of the device, the tray 10 and bail 11 are locked in their adjusted relation to each other, and for this purpose the tray is provided with two upstanding brace members 18 formed of flat metal bars and provided with undercut notches 19 in their outer vertical edge portions, in which notches the leg portions of the bail 11 are received with a releasable interlocking effect which gives ample rigidity to the adjusted structure.

The upright brace members 18, as shown, have right angular extensions 20 which are riveted to the underside of the tray bottom, as at 21, while the upper end portions of said braces 18 are hooked, as at 22, as an aid in carrying the tray and also for supporting the tray by means other than the inclined steering wheel shown in Figure 1, as will later more fully appear.

In addition to providing for the relative angular adjustment between the tray 10 and bail 11 whereby the tray may be supported with ample stability in a horizontal position on steering wheels of different inclinations, it is preferable to provide a menu card holder 23 and to locate the same between said upright braces 18 whereby to further reenforce and stiffen the structure as well as to locate the menu card in a convenient position out of the way of the tray as well as being in full view of the user of the tray. As shown, this holder comprises a sheet metal plate of rectangular form which is bent back upon itself at opposite ends, as at 24, and again rebent outwardly, as at 25, to provide channels in which the adjacent inner vertical edge portions of the upright braces 18 are received. In this connection it is preferable to provide a space 26 between the inturned end portions 24 of the plate 23 to serve as guides and holders for the opposite end portions of the menu card, and, to support the lower longitudinal edge portion of the card in the holder, the lower marginal portion of the sheet 23 is turned upwardly and spaced therefrom on the inner side of the sheet, as at 27, thereby providing a channel 28 in which the lower marginal portion of the menu card is received.

Preferably, a support for a cigar or cigarette is located adjacent the lower portion of one of said upright braces 18. As shown, this holder, designated by the numeral 29, comprises a sheet metal clip riveted to the member 18 and having a laterally turned upper end portion 30 which is curved or otherwise formed transversely to provide an ample depression or channel to retain the cigar or cigarette thereon. Adjacent the opposite upright brace member 18 there is a spring clip 31 which may be utilized to retain a match or a sales check. So, too, a separate bottle or drinking glass holder 32 may be provided either fixedly or removably upon the tray 10. As shown, this holder 32 comprises a flat base portion of sheet metal having a plurality of tongues 33 extending upwardly therefrom in opposed spaced relation to each other (see Figures 1 and 2).

While the device of the present invention is designed primarily for attachment to an inclined steering wheel and is ideally adapted for such use, it is here noted that it is readily supported on the horizontal cross member 34 of a loading rack 35, as shown in Figure 6, by the provision of the hooked end portions 22 on the upright brace members 18, and by which provision it is also obvious that the tray may be supported in other convenient places, as upon a vertical steering wheel or a window ledge or the like.

Obviously, the structure admits of considerable modification within the spirit of the invention as defined by the appended claims. The invention, therefore, is not limited to the specific construction and arrangement shown in the accompanying drawings.

What I claim is:

1. In a serving tray, a flanged body constituting the tray proper, a substantially U-shaped bail hingedly attached at its opposite ends to the ends of said tray body, and upright brace members on said tray body near the opposite ends thereof, said brace members having notched marginal portions for releasable interlocking engagement of the adjacent bail members whereby to support the tray upon the lower portion of an inclined steering wheel in level working position with the transverse middle portion of the bail engaged under the upper portion of the wheel.

2. A serving tray comprising a tray body proper, a bail hingedly attached at its opposite ends to the end portions of the tray body medially thereof, said bail being engageable over the upper portion of a steering wheel with the tray body resting edgewise against the lower portion of the wheel, and means comprising upstanding marginally notched brace members on said tray body for releasably locking the latter and said supporting bail in adjusted relation to each other.

3. A serving tray for automobiles and the like, comprising a tray body proper, a bail-like supporting element hingedly attached at its opposite ends to the end portions of the tray body, the middle portion of said supporting element being engageable over the upper portion of an inclined steering wheel of the vehicle whereby to support the tray with its inner edge portion resting against the lower portion of the steering wheel, and upstanding brace members on the tray body proper, the upper end portions of said brace members being outwardly and downwardly hooked for suspendedly supporting the tray from a support other than an inclined steering wheel and said brace members having provision for releasable interlocking engagement of the leg portions of the bail-like supporting element therewith at different positions throughout the length thereof whereby to level the tray body proper when the tray is supported on an inclined steering wheel.

4. A serving tray for automobiles and the like, comprising a tray body proper, a bail-like supporting element hingedly attached at its opposite ends to the end portions of the tray body, the middle portion of said supporting element being engageable over the upper portion of an inclined steering wheel of the vehicle whereby to support the tray with its inner edge portion resting against the lower portion of the steering wheel, upstanding brace members on the tray body proper, the upper end portions of said brace members being outwardly and downwardly hooked for suspendedly supporting the tray from a support other than an inclined steering wheel and said brace members having provision for releasable interlocking engagement of the leg portions of the bail-like supporting element therewith at different positions throughout the length thereof whereby to level the tray body proper when the tray is supported on an inclined steering wheel, and a combined backing and reinforcing plate secured at its opposite ends to said brace members and provided with vertical slideways adjacent said brace members and having its lower marginal portion rebent in spaced relation to the front face of the plate to provide a flanged supporting ledge.

ROBERT S. MORRIS.